(No Model.)
R. L. STEEN.
POT.
No. 541,023.   Patented June 11, 1895.
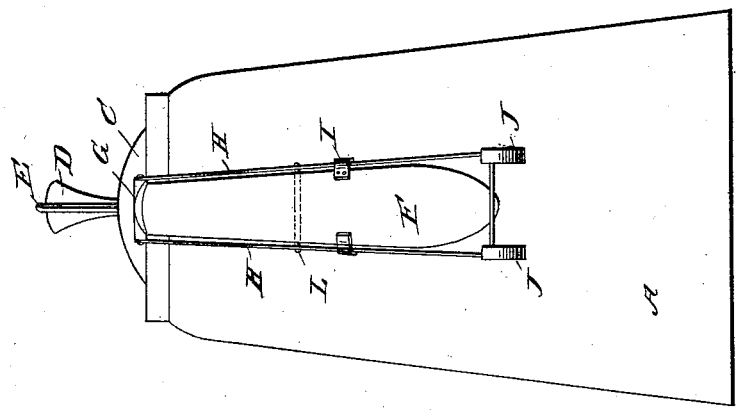
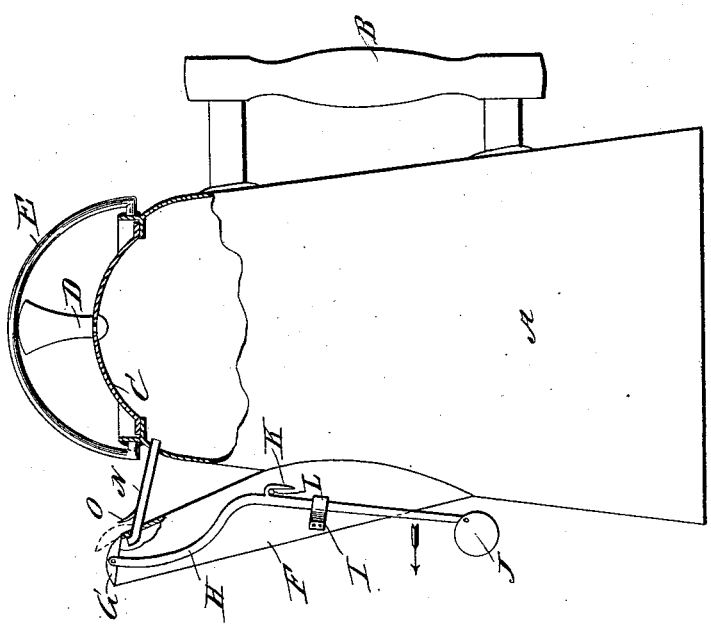
WITNESSES:
John A. Renner
Theo. G. Hoster
INVENTOR
R. L. Steen
BY
ATTORNEYS

UNITED STATES PATENT OFFICE.

ROBERT L. STEEN, OF LAWRENCE, KANSAS, ASSIGNOR TO WILLIAM ORR, OF SAME PLACE.

POT.

SPECIFICATION forming part of Letters Patent No. 541,023, dated June 11, 1895.

Application filed January 8, 1895. Serial No. 534,170. (No model.)

*To all whom it may concern:*

Be it known that I, ROBERT L. STEEN, of Lawrence, in the county of Douglas and State of Kansas, have invented new and useful Improvements in Pots, of which the following is a full, clear, and exact description.

The object of the invention is to provide certain new and useful improvements in coffee and other pots, whereby all escape of steam is prevented, and the valuable properties contained in the substance under treatment are retained, instead of being free to escape with the steam as has been the case in pots heretofore constructed.

The invention consists in certain parts and details, and combinations of the same, as will be hereinafter fully described and then pointed out in the claims.

Reference is to be had to the accompanying drawings, forming a part of this specification, in which similar letters of reference indicate corresponding parts in both views.

Figure 1 is a side elevation of the improvement, with parts in section; and Fig. 2 is a front elevation of the same.

The pot A, of any suitable material, is provided with the usual handle B, and the lid or cover C, formed in its middle with an extension D adapted to be engaged by the bail E, so as to securely lock the lid or cover C in position on the upper end of the pot. The latter is provided with the usual spout F, adapted to be closed at its outer end by a valve G, pivotally connected at its sides with the arms H, which are pivoted to the spout and provided with weights J at their lower ends, so that the valve will be held closed when the pot is in its normal position. The arms H are connected at their lower ends and are preferably pivoted to the spout as shown, wherein hooks K on the arms engage the ends of a pin L secured in the spout. In order to limit the outward movement of the arms H and guide them in their swinging movement, guide stops I are secured to the spout and project over the said arms, as clearly shown in Fig. 1.

The upper end of the spout F is connected with the upper end of the pot A by an air pipe N, having the end within the spout F bent upward, as plainly indicated in Fig. 1. On this pipe is secured a rest O, against which the valve G abuts when it leaves its seat on the upper end of the spout and adapted to act in connection with the arms H to tilt the valve when the pot A is tilted to pour the contents of the same through the spout F.

It will be seen that when the pot A is charged with water and the substance to be treated, the lid C closed and locked in place by the bail E, and the valve G held closed by the weighted arms H, then the steam generated within the pot A when the latter is subjected to heat, is prevented from escaping from the pot, and consequently the valuable properties of the substance under treatment are prevented from being carried off by the steam. When the coffee is prepared and the pot A is taken from the fire, and the contents of the pot are to be poured, then the operator takes hold of the handle B, and tilts the pot in the usual manner, so that the valves G readily open to permit the out-flow of the liquid from the pot. As the lid C is still closed and locked in placed on the upper end of the pot A, the air passing through the pipe N into the upper end of the pot insures a free flowing of the liquid through the spout F.

By the arrangement described, no valuable properties of the substance under treatment can be lost owing to evaporation, as the pot is always closed as soon as it is set on its bottom, it being understood that the valve G only opens when tilted, or by an excess of pressure within the pot A.

Having thus described my invention, I claim as new and desire to secure by Letters Patent—

1. The combination with a coffee pot or similar vessel, of a valve adapted to close the spout, and weighted arms pivoted to the spout and having their upper ends pivoted to the sides of the valve, substantially as described.

2. The combination with a coffee pot or the like, of a valve for closing the spout, weighted arms pivoted to the spout, and having their upper ends pivoted to the valve, and stops secured to the spout to limit the outward swinging movement of the said arms, substantially as described.

3. The combination with a coffee pot or the like having projections on its spout, of a valve for closing the spout, arms provided with hooks engaging the projections of the spouts, weights on the lower ends of the arms, and guide stops secured to the spout and projecting over the said arms, substantially as described.

4. The combination with a coffee pot or the like, of a valve for closing the spout, weighted arms pivoted on the spout and having their upper ends pivoted to the valve, and a stop against which the valve abuts when it leaves its seat, substantially as and for the purpose set forth.

ROBERT L. STEEN.

Witnesses:
WILLIAM ORR,
DANIEL S. ALFORD.